Patented Jan. 9, 1951

2,537,933

UNITED STATES PATENT OFFICE 2,537,933

PREPARATION OF ANTIBIOTIC SALTS OF MONO (HIGHER-ALIPHATIC) SULFATES, AND PURIFICATION OF THE ANTIBIOTICS THEREBY

William A. Lott, Maplewood, Jack Bernstein, New Brunswick, and Leon J. Heuser, Robbinsville, N. J., assignors to E. R. Squibb & Sons, New York, N. Y., a corporation of New York No Drawing. Application August 9, 1947, Serial No. 767,851

16 Claims. (Cl. 260—210)

This invention relates to basic antibiotics of the streptomycin type, i. e., to members of the genus composed of streptomycin and antibiotically-active basic compounds which (like streptomycin) are capable of forming water-soluble salts with acids such as sulfuric and water-insoluble salts with organic base-precipitating reagents (e. g., derivatives of streptomycin, such as dihydrostreptomycin, and similarly-acting antibiotics, such as streptothricin).

In 1944, Schatz, Bugie, and Waksman (Proc. Soc. Exp. Biol. Med. 1944, 57, 244) showed that a potent antibiotic, termed "streptomycin," was formed during the growth of the organism *Actinomyces griseus* (now called *Streptomyces griseus*); and this antibiotic has since been demonstrated to be of high clinical utility.

It was later found that a number of streptomycins are formed at the same time. The first streptomycin obtained in pure crystalline form (as a reineckate) and fully characterized (Wintersteiner and Fried application, Serial No. 666,541, filed May 1, 1946, now Patent No. 2,501,014, dated March 21, 1950) is now referred to as "streptomycin A"; and the second streptomycin characterized (Fried and Titus application Serial No. 737,400, filed March 26, 1947) is now referred to as "streptomycin B." Moreover, there are indications that still other streptomycins are formed at the same time and/or may be formed at the same time by changes in the culture conditions; and it is intended that each of such antibiotics and any mixtures thereof (whether in the form of the free base or water-soluble salt thereof) be comprehended by the term "streptomycin" when employed unmodified hereinafter.

Streptomycin has been purified heretofore by various methods, all of which were complex and/or inefficient (and consequently expensive). For example, a method widely employed prior to this invention essentially comprised the following steps: (1) treating a primary streptomycin-containing liquid with an activated charcoal, which selectively adsorbs the streptomycin; (2) eluting the streptomycin from the charcoal with an aqueous, water-soluble mineral acid, preferably at a slightly elevated temperature (say about 30–50° C.); (3) treating the eluate with an organic-base-precipitating reagent, preferably phosphotungstic acid; and (4) decomposing the precipitate. (The term "primary streptomycin-containing liquid" comprehends, inter alia: (a) the culture liquid obtained by growing *Streptomyces griseus* under conditions and in a medium suitable for the production of streptomycin, and removing the solids from the medium; (b) the culture liquid of enhanced potency obtained by acidification of such culture (with hydrochloric or sulfuric acid, for example), the liquid being neutralized; and (c) the liquid obtained by acid-extraction of the solids separated from such culture, the liquid being neutralized.)

It is the object of this invention to provide simple, efficient, and otherwise advantageous methods of purifying basic antibiotics of the streptomycin type—especially streptomycin; and it is a further object of this invention to provide methods of preparing certain salt-type derivatives of basic antibiotics of the streptomycin type.

It has been found that basic antibiotics of the streptomycin type interact with surface-active agents of the organically-substituted polybasic-inorganic-acid type to form certain salt-type combinations which are much less soluble in water and more soluble in certain water-immiscible organic solvents than the antibiotics; and it has also been found that such salt-type derivatives of the antibiotics may be decomposed to recover the antibiotics.

The methods of this invention essentially comprise intimately contacting an aqueous solution of a basic antibiotic of the streptomycin type (especially streptomycin) with a surface-active agent of the organically-substituted polybasic-inorganic-acid type and a substantially water-immiscible organic solvent for soaps (including invert soaps), preferably with a substantially water-immiscible aliphatic alcohol, and notably with amyl alcohol mixtures; and the purification methods of this invention essentially comprise intimately contacting an aqueous solution of an impure basic antibiotic of the streptomycin type (e. g., a primary streptomycin-containing liquid, or an aqueous solution of a partially-purified streptomycin, such as the eluate referred to hereinbefore) with a surface-active agent of the organically-substituted polybasic-inorganic-acid type and a substantially water-immiscible organic solvent for soaps, recovering the organic solvent phase, and converting the salt-type derivative of the antibiotic therein into a water-soluble salt of the antibiotic, preferably by intimately contacting the organic solvent solution with an aqueous, water-soluble, relatively-strong acid (especially with an aqueous, water-soluble, relatively-strong mineral acid), and recovering the aqueous phase. The water-soluble salt (of the basic antibiotic of the streptomycin type) recovered from the aqueous solution thus obtained is considerably purer than the antibiotic treated, and the recovery of antibiotic activity in the purification treatment is of a high order. By the practice of this invention, it is possible to obtain uniformly high yields of relatively-pure streptomycin (for example) having a potency above about 400 units/mg.

Among the preferred surface-active agents of the organically-substituted polybasic-inorganic-acid type for the purposes of this invention are those of the formula R—O—X—O—Y wherein R is the residue of a substantially water-immiscible organic hydroxyl compound, —O—X—O— is the divalent acid-residue of a water-soluble polybasic inorganic acid (e. g., sulfuric or phosphoric acid), and Y is a member of the group consisting of H and cations forming water-soluble salts with the anion R—O—X—O—. Notable among such wetting agents for the purposes of this invention are those in which the polybasic-inorganic-acid is sulfuric, and the acid is partially esterified with a higher aliphatic alcohol, i. e., wetting agents of the group consisting of mono (higher-aliphatic) esters of sulfuric acid, and water-soluble salts thereof.

Other preferred surface-active agents of the organically-substituted polybasic-inorganic-acid type for the purposes of this invention are those of the group consisting of aromatic sulfonic acids, sulfonated oils, sulfonated higher fatty acid derivatives, and water-soluble salts thereof.

Among the partial higher-alkyl esters of sulfuric acid utilizable in the practice of this invention are: the group of sodium salts of sulfates of synthetic higher aliphatic alcohols, such as

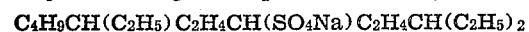
$C_4H_9CH(C_2H_5) C_2H_4CH(SO_4Na) C_2H_4CH(C_2H_5)_2$

[e. g., Tergitol Penetrant 7],

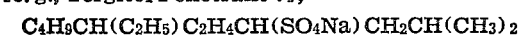
$C_4H_9CH(C_2H_5) C_2H_4CH(SO_4Na) CH_2CH(CH_3)_2$

[e. g., Tergitol Penetrant 4], and

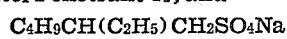
$C_4H_9CH(C_2H_5) CH_2SO_4Na$

[e. g., Tergitol Penetrant 08]; and the series of partial sulfuric-acid esters of higher aliphatic alcohols and their salts, such as sodium octyl sulfate, sodium oleyl sulfate, sodium cetyl sulfate, sodium stearyl sulfate, and sodium lauryl sulfate [e. g., Aurinol, Wetanol, the Duponols, and the Gardinols]. Among the aromatic sulfonic acids, sulfonated oils, and sulfonated higher fatty acid derivatives utilizable in the practice of this invention are: the sodium sulfonates of higher fatty acid esters and amides, such as the sodium salt of sulfonated ethyl (or other alkyl) oleate [e. g., Igepon AP Extra], and

$C_{17}H_{33}CONHC_2H_4SO_3Na$

[e. g., Igepon T]; the sodium sulfonates of petroleum hydrocarbons [e. g., Ultrawet]; the sodium salt of a polyalkyl benzene sulfonic acid having ten carbon atoms [e. g., Ultrawet, 40 A], and other sodium alkyl aryl sulfonates [e. g., Nacconol NRSF]; and Turkey red oil (i. e., sulfonated castor oil). Among the partial esters of phosphoric acids utilizable in the practice of this invention are dicresyl phosphate, lecithin, and a phosphorated higher alcohol of the formula (capryl)$_5Na_5P_6O_{20}$ [e. g., W. A. 58].

The substantially water-immiscible organic solvents for soaps utilizable in the practice of this invention include, inter alia: aliphatic alcohols, such as n-amyl (1-pentanol), n-butanol (1-butanol), sec. butanol, methyl-isobutyl-carbinol, methyl-amyl-carbinol, methyl-isopropyl-carbinol, isobutyl-carbinol, 2-ethyl-hexanol, and amyl alcohol mixtures, such as refined fermentation-amyl-alcohol; aliphatic alcohol esters of lower fatty acids, such as the acetate of methyl-isobutyl-carbinol, and amyl acetate; aliphatic ketones, such as methyl-isobutyl ketone; aliphatic ethers, such as di-n-butyl ether, and diethyl ether; hydrocarbons, such as benzene and toluene; and halogenated hydrocarbons, such as ethylene dichloride, chloroform, and carbon tetrachloride.

Among the water-soluble, relatively-strong acids utilizable for recovery of the antibiotics from their salt-type combinations with the surface-active agents are sulfuric, hydrochloric, phosphoric, oxalic, citric, sulfamic, and nitric.

For maximum efficiency, the amount of the surface-active agent employed should be in excess of that required to combine with all the antibiotic in the solution treated, the optimum amount of surface-active agent being therefore dependent on the concentration of the antibiotic solution treated and the potency of the antibiotic.

In one embodiment of the invention, an aqueous solution of an impure antibiotic of the streptomycin type is intimately contacted with a solution of the surface-active agent in a substantially water-immiscible organic solvent for soaps; the organic solvent phase is recovered and intimately contacted with an aqueous, water-soluble, relatively-strong acid; and the aqueous phase is recovered and dried, preferably freeze-dried (i. e., frozen and subjected to a high vacuum to sublime off the water). Alternatively, the intimate contact between the antibiotic solution, surface-active agent, and organic solvent may be effected by first mixing the antibiotic solution with the surface-active agent, and then intimately contacting the mixture with the organic solvent; or by first mixing the antibiotic solution with the organic solvent and then intimately contacting the mixture with the surface-active agent.

Preferably, especially when the aqueous solution of impure antibiotic treated is a culture filtrate, the organic solvent solution obtained is washed with water before treatment with the aqueous acid, the wash removing a considerable amount of inactive solids but practically none of the antibiotic.

The distribution coefficient of the salt-type combination of the antibiotic and surface-active agent between the aqueous and organic solvent phases is dependent upon pH. Thus, when using a n-amyl alcohol solution of Ultrawet, 40A, maximum transference of streptomycin from the aqueous solution treated is obtained when the pH of the aqueous phase is adjusted to between about 2 and about 8, especially between about 3 and 4.

Alternatively, the salt-type combination of the antibiotic and the surface-active agent may be recovered from the solution in the organic solvent and then converted into a water-soluble salt, or used as a therapeutic agent per se. Thus, the salt-type derivative of the antibiotic may be recovered by evaporating off the organic solvent in vacuo, or (where the organic solvent lends itself to such procedure, as in the case of benzene, for example, by freeze-drying the solution). Alternatively, the salt-type derivative of the antibiotic may be obtained more directly by the precipitation method described and claimed in application Serial No. 767,852, filed of even date herewith. These salt-type derivatives of antibiotics are, in general, oil-soluble or oil-dispersible; and they may be used therapeutically, e. g., orally administered either per se or in oily media for the treatment of intestinal disorders (relying on intestinal processes to liberate the antibiotic in water-soluble form), or parenterally administered in oily media (or administered by implantation of a pellet of the solid) for prolonged antibiotic action. Where production of the salt-type derivative of the antibiotic—rather than purification of the antibiotic—is the objective, one may employ a reconstituted aqueous solution of the antibiotic (e. g., an aqueous solution of the highly purified or pure antibiotic).

The various extractions involved in the methods of this invention may of course be carried out by the countercurrent technique; and the spent solutions and/or extracts may be reemployed in the method for further removal of activity and/or concentration of the extracted material. Thus, the spent antibiotic-containing liquid may be extracted with a fresh batch of surface-active agent and organic solvent; the spent organic solvent may be extracted with a fresh batch of aqueous, water-soluble relatively-strong acid, or such solvent may be used on a fresh batch of antibiotic-containing liquid; and/or the aqueous acid extract may be used to treat a fresh batch of organic solvent solution, to build up the antibiotic concentration therein.

The following examples are illustrative of the invention (all solutions or dilutions referred to without identification of the solvent or diluent being solutions in or dilutions with water):

EXAMPLE 1

(a) 350 mg. streptomycin hydrochloride is dissolved in 70 ml. water saturated with n-butanol; the solution is mixed with 70 ml. of a 7% solution of sulfated oleyl alcohol (e. g., Aurinol DS) in n-butanol saturated with water; the mixture is shaken in a separatory funnel for 5 minutes at room temperature; and the n-butanol layer formed on standing is recovered. About 94.9% of the streptomycin in the aqueous solution is thus extracted into the n-butanol (as a salt-type combination of streptomycin and the sulfated oleyl alcohol).

Similarly, about 90–98% of the streptomycin present in aqueous solutions in concentrations of 400–4,000 units/ml. may be extracted into n-butanol with the aid of other partial sulfuric-acid esters of higher aliphatic alcohols (e. g., Duponol-C or Turkey red oil).

On similar extraction of a streptomycin-containing culture filtrate [obtained by growing *Streptomyces griseus* in submerged culture in an aqueous medium containing soybean meal, dextrose, and sodium chloride, acidifying the incubated culture, and filtering] having a potency of 391 units/ml., and a pH of about 5–7, preferably about 6.1, about 80–95% of the culture-filtrate activity is extracted into the n-butanol; and on similar extraction of a streptomycin-containing eluate [obtained by treating a streptomycin-containing culture filtrate with an activated charcoal, and eluting the streptomycin from the charcoal with dilute hydrochloric, nitric, or sulfuric acid] having a potency of 201 units/ml. and a pH of 6.8, about 90–98% of the eluate activity is extracted into the n-butanol.

(b) 48 ml. of the n-butanol solution of the salt-type combination of streptomycin and the sulfated oleyl alcohol is shaken with 48 ml. water in a separatory funnel at room temperature; and 5% hydrochloric acid is added dropwise with shaking until the pH reaches 2.0. The separated clear aqueous phase is passed through a column of anion-exchange-resin (e. g., Amberlite IR–4B; cf. U. S. Patent 2,402,384, dated June 18, 1946), to bring the pH up to 7.6, and then freeze-dried. The streptomycin hydrochloride thus obtained, in a yield of about 53%, has a potency of about 542 units/mg.

The salt-type combinations of streptomycin and other partial sulfuric-acid esters of higher aliphatic alcohols or Turkey red oil obtained as described in section (a) of this example may be similarly decomposed.

(b: alternative) 80 ml. of the n-butanol solution of the salt-type combination of streptomycin and the sulfated oleyl alcohol is cooled, passed through a 5-inch (32 g.) column of sulfuric-acid-washed alumina (pH 4.0) under suction; and the column is eluted with a 0.1 normal solution of hydrochloric acid in anhydrous methanol. The eluate is collected in 10 ml. fractions; and the active fractions (or fractions 3 to 9 inclusive) are combined and treated with anhydrous ether to precipitate the streptomycin hydrochloride. The precipitate is separated by centrifugation, dissolved in a minimum quantity of dry methanol, and reprecipitated with dry ether. The precipitate (separated by centrifugation) is dissolved in about 5 ml. water, and the solution is freeze-dried. The streptomycin hydrochloride obtained (in an over-all yield of about 56%) has a potency of about 636 units/mg.

Similar decomposition of the salt-type combinations obtained from the following streptomycins and surface-active agents gives streptomycin hydrochloride of the indicated approximate potency and in the indicated approximate over-all yields:

| Salt-type Combination of— | | Freeze-dried Streptomycin Hydrochloride | |
|---|---|---|---|
| Streptomycin | Surface-active Agent | Potency, units/mg. | Yield, Percent |
| 92 units/mg. | Partial sulfuric-acid ester of higher aliphatic alcohol (e. g., Duponol C). | 470 | 78 |
| culture filtrate, 391 units/ml. | do | 239 | 35 |
| eluate, 201 units/ml. | Turkey red oil | 105 | 38 |

EXAMPLE 2

(a) 170 ml. of a 25% aqueous solution of the surface-active agent

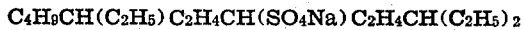

[e. g., Tergitol Penetrant 7] is added to 4 liters of a streptomycin-containing culture filtrate having a potency of 142 units/ml.; the mixture is adjusted to pH 6.35 with 10% sodium hydroxide solution, while stirring; and 670 ml. or refined fermentation-amyl-alcohol is added, and the mixture is stirred for 5 minutes. The amyl alcohol phase, separated by centrifuging, contains about 85% of the activity of the culture filtrate.

(b) 250 ml. water is added to the amyl alcohol solution, and the mixture is adjusted to pH 0.5 by adding 10% sulfuric acid while stirring. The aqueous extract formed on separation of the layers is stirred with an anion-exchange resin of the type described hereinbefore (e. g., Amberlite IR–4B) to decrease the acidity to pH 5.7. The aqueous extract, which contains about 60% of the activity of the culture filtrate, is freeze-dried, yielding about 7.1 g. streptomycin sulfate having a potency of about 33 units/mg.

EXAMPLE 3

(a) 50 ml. of a saturated aqueous solution of an alkylated monosodium benzene sulfonate having several alkyl groups totalling ten carbon atoms (e. g., Ultrawet, 40 A) is mixed with 300 ml. refined fermentation-amyl-alcohol, and the mixture is adjusted to pH 2.0 by adding sulfuric acid while stirring. The amyl alcohol layer is separated and added to 3 liters of a streptomycin-hydrochloride-containing eluate having a potency of 296 units/ml.; the mixture is adjusted to pH 3.3 by adding aqueous sodium hydroxide solution, while stirring; and the mixture is stirred for an hour, and the amyl alcohol layer is recovered.

(b) The amyl alcohol extract is extracted 3 times with 75 ml. portions of aqueous sulfuric acid of pH 0.5; the acid extracts are combined and treated with barium hydroxide solution to pH 8–10; and the precipitate formed is filtered off. The filtrate is adjusted to pH 6.2 with sulfuric acid; the precipitated barium sulfate is filtered off; and the filtrate is freeze-dried, yielding about 1.0 g. streptomycin sulfate having a potency of about 433 units/mg.

For brevity, the details of other examples procedurally analogous to Example 3 but illustrating variations of the invention are given hereinafter in tabular form (Table I).

about 0.3 g. streptomycin sulfate (potency about 337 units/mg.).

EXAMPLE 10

(a) 4 liters of a streptomycin-hydrochloride eluate (185 units/ml.) is adjusted to pH 7.0 with sodium hydroxide solution, and the precipitate formed is filtered off. 20 g. solid sodium salt of polyalkyl benzene sulfonate (e. g., Ultrawet E) is added to the filtrate, the pH is adjusted to 3.5 with dilute sulfuric acid, one liter refined fermentation-amyl-alcohol is added, the mixture is stirred for an hour, and the amyl alcohol layer is recovered.

(b) The amyl alcohol solution is extracted 4 times with 50 ml. portions of dilute sulfuric

Table I

| Example No. | Surface-active agent used and quantity | Organic solvent used, and quantity | pH adjusted with sulfuric acid to | Type of streptomycin hydrochloride solution treated, quantity, and potency | pH adjusted with sodium-hydroxide solution to | pH of sulfuric acid extract adjusted with barium hydroxide solution to | pH of filtrate adjusted with aqueous sulfuric acid to | Approximate weight and potency of streptomycin sulfate obtained |
|---|---|---|---|---|---|---|---|---|
| 4 | 25% solution of Tergitol Penetrant 7 (cf. Example 2), 250 ml. | Refined fermentation-amyl-alcohol, 1 liter. | 3.7 | Eluate, 8 liters, 421 units/ml. | 3.4 | 11.5 | 6.0 | 3.5 g., 443 units/mg. |
| 5 | Saturated aqueous solution of Ultrawet, 40A (cf. Example 3), 134 ml. | Refined fermentation-amyl-alcohol, 500 ml. | 3.4 | Eluate, 4 liters, 462 units/ml. | 3.5 | 11.3 | 6.0 | 3 g., 483 units/mg. |
| 6 | Saturated aqueous solution of Ultrawet, 40A (cf. Example 3), 250 ml. | Methyl-amyl-carbinol, 1 liter. | 3.2 | Eluate, 8 liters, 337 units/ml. | 3.4 | 12.5 | 6.4 | 3.5 g., 209 units/mg. |
| 7 | do | Amyl acetate, 1 liter. | 3.4 | Eluate, 8 liters, 500 units/ml. | 3.65 | 12 | 6.2 | 6 g., 408 units/mg. |
| 8 | Saturated aqueous solution of Ultrawet, 40A (cf. Example 3), 300 ml. | Refined fermentation-amyl-alcohol, 1 liter. | 3.4 | Culture-filtrate, 8 liters, 180 units ml. | 3.5 | 6.6 | | 8 g., 30 units/mg. |

EXAMPLE 9

(a) 3.5 liters of a streptomycin-hydrochloride eluate (280 units/mg.) is adjusted to pH 5.0 with sodium hydroxide solution, and 40 g. sulfonated castor oil and 500 ml. amyl acetate are added thereto. The mixture is stirred for an hour; and the amyl acetate layer is separated.

(b) The amyl acetate solution is extracted with N/10 sulfuric acid; the aqueous layer is separated, neutralized with barium hydroxide solution, and filtered; and the filtrate is freeze-dried, yielding acid (pH 0.5); and the acid extracts are combined, and adjusted to pH 12.0 with barium hydroxide. The resulting precipitate is filtered off, the filtrate is adjusted to pH 5.9 with dilute sulfuric acid, and filtered; and the filtrate is freeze-dried, yielding about 2 g. streptomycin sulfate (potency about 291 units/mg.).

For brevity, the details of other examples procedurally analogous to Example 10 but illustrating further variations of the invention are given hereinafter in tabular form (Table II).

Table II

| Example No. | Type of streptomycin-containing solution treated, quantity, and potency | pH adjusted to | pH adjusted with | Surface-active agent added, and quantity | Organic solvent added, and quantity | Organic solvent layer extracted with | pH of acid extract adjusted with barium hydroxide to | Approximate weight and potency of streptomycin sulfate obtained |
|---|---|---|---|---|---|---|---|---|
| 11 | Sulfuric-acid eluate, 4 liters, 140 units/ml. | 6.7 | Powdered barium hydroxide. | Ultrawet - E (cf. Example 10), 10 g. | Refined fermentation-amyl-alcohol, 500 ml. | Dilute sulfuric acid pH 3.0. | 12 | 1 g. 396 units/mg. |
| 12 | Eluate, 4.5 liters, 140 units/ml. | neutrality | Sodium hydroxide solution. | Ultrawet - E (cf. Example 10), 15 g. | Amy acetate, 2 extractions, 300 ml. each. | Dilute sulfuric acid, pH 0.5; 2 extractions, 50 ml. each. | 12 | 1 g., 319 units/mg. |
| 13 | Sulfuric-acid eluate, 10 liters, 140 units/ml. | 6.0 / 7.3 | Amberlite IR-4B (cf. Example 2). / Barium hydroxide. | Ultrawet-E (cf. Example 10), 25 g. | Refined fermentation amyl-alcohol, 1 liter. | Normal sulfuric acid. | 7 | 1.63 g. 417 units/mg. |
| 14 | Eluate, 4 liters, 250 units/ml. | 8 | Ammonium hydroxide solution. | 4.6% solution of the acid form of Tergitol Penetrant 7 (cf. Example 2) in refined fermentation-amyl-alcohol, 190 ml. | Refined fermentation-amyl-alcohol, 200 ml. | Sulfuric acid of pH 3.7. / Sulfuric acid of pH 0.5. | 12 | 1.28 g., 252 units/mg. |

EXAMPLE 15

1 g. streptomycin having a potency of 228 units/mg. is dissolved in 1 liter water, and 25 ml. of a solution of Tergitol Penetrant 7 (cf. Example 2) is added, followed by 100 ml. refined fermentation-amyl-alcohol; the mixture is adjusted to pH 3.3 while stirring, and stirred for an additional half-hour; and the amyl alcohol layer formed is recovered. The amyl alcohol solution, containing about 75% of the streptomycin in the aqueous solution treated, is extracted with dilute sulfuric acid (pH 0.5); and the aqueous acid extract, containing about 80% of the streptomycin in the amyl alcohol solution, is further treated as described hereinbefore.

EXAMPLE 16

(a) 150 ml. of a 25% aqueous solution of the surface-active agent

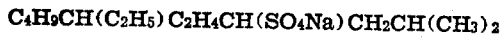

[e. g., Tergitol Penetrant 4] and 500 ml. refined fermentation-amyl-alcohol are added to 3 liters of a streptomycin-containing culture filtrate (potency 50 units/ml.; pH 1.5); the pH is adjusted to 4.0 and the mixture is shaken; the resulting emulsion is broken by centrifuging; and the amyl-alcohol layer (containing about 95% of the culture filtrate activity) is recovered.

(b) The amyl alcohol solution is extracted with 25% sulfuric acid to pH 0.5; the aqueous layer formed is recovered, neutralized to pH 6.8 with barium hydroxide, and filtered; and the filtrate is freeze-dried, yielding a white solid, representing about 97% of the activity of the amyl alcohol solution.

Modification of the procedure detailed in (a) to the extent of treating a streptomycin-containing culture filtrate having a potency of 115 units/ml. and a pH of 1.7, using 200 ml. of a 25% solution of a higher aliphatic alcohol sulfate (e. g., a Duponol) in place of the Tergitol Penetrant 4, and adjusting the pH to 3.5 instead of 4.0, yields an amyl alcohol solution containing about 90% of the activity of the culture filtrate.

EXAMPLE 17

(a) 150 ml. of a 25% aqueous solution of Tergitol Penetrant 4 (cf. Example 16) and 500 ml. refined fermentation-amyl-alcohol are added to 3 liters of a streptomycin-containing culture filtrate (potency 150 units/ml.; pH 1.6); the pH is adjusted to 3.5 and the mixture is further treated as described in sections a and b of Example 16 to obtain a spent amyl alcohol layer and an aqueous acid extract. [The spent amyl alcohol is then used with 50 ml. additional solution of Tergitol Penetrant 4 to extract 3 liters of new streptomycin-containing culture filtrate (and the spent amyl alcohol from this extraction may in turn be used to extract new culture filtrate in the same way).] The aqueous acid extract is treated as further described in section b of Example 16. Alternatively, the aqueous acid extract is then used to extract the amyl alcohol extract obtained from a new batch of streptomycin-containing culture filtrate, thus building up the concentration of streptomycin sulfate in the aqueous acid extract.

EXAMPLE 18

(a) 100 ml. of an aqueous solution of streptomycin hydrochloride having a potency of 10,400 units/ml. is intimately mixed with 50 ml. ether containing 11.3 ml. Tergitol Penetrant 7 (25% aqueous solution). After standing, the ether layer formed (containing about 97% of the activity of the aqueous solution treated) is recovered.

Substitution of benzene for the ether results in extraction of about 98% of the activity. The emulsification difficulties encountered with this solvent are overcome by allowing the mixture to stand for 12–16 hours in the cold before separating the layers.

(b) An ether solution obtained as described in section (a) containing streptomycin derivative equivalent to 1,016,000 units streptomycin, is mixed with a solution of 5 g. $AlCl_3$ in 25 ml. ether; the precipitate formed is removed by centrifugation, and dissolved in water; the aqueous solution is neutralized with diluted potassium hydroxide solution; and the solution is filtered and freeze-dried, yielding about 3.62 g. streptomycin hydrochloride having a potency of 222 units/mg. (a yield of about 79%).

In place of the $AlCl_3$ used for the decomposition of the salt-type derivative of streptomycin, one may employ equivalent salts, such as $ZnCl_2$ or $FeCl_3$.

Among other basic antibiotics of the streptomycin type which may be treated by the methods of this invention are streptothricin and dihydrostreptomycin; and among other basic antibiotics of the streptomycin type utilizable for the preparation of salt-type combinations with the surface-active agents in accordance with this invention are pure (or substantially-pure) streptomycin A, streptomycin B, dihydrostreptomycin A, and dihydrostreptomycin B.

The basic antibiotic of the streptomycin type purified by the method of this invention may be further purified by repetition of the same purification method. Also, it may be preliminarily purified or further purified by any other method, especially by one of the following: (I) intimately contacting an aqueous solution of the antibiotic with a substantially water-insoluble carboxylic acid and a substantially water-immiscible organic solvent for the carboxylic acid, recovering the organic solvent phase, and converting the salt-type derivative of the antibiotic therein into a water-soluble salt of the antibiotic: (cf. application Serial No. 762,205, filed July 19, 1947); (II) treating an aqueous solution of the antibiotic with a water-soluble salt of a substantially water-insoluble carboxylic acid, recovering the precipitated salt-type combination of the antibiotic and the carboxylic acid, and converting it into a water-soluble salt of the antibiotic (cf. application Serial No. 762,206, filed July 19, 1947); and (III) intimately contacting an aqueous solution of the antibiotic with a surface-active agent of the organically-substituted polybasic-inorganic-acid type, recovering the precipitated salt-type combination of the antibiotic and the surface-active agent, and converting it into a water-soluble salt of the antibiotic (cf. application Serial No. 767,852, filed of even date herewith).

The invention may be variously otherwise embodied within the scope of the appended claims.

We claim:

1. The method which comprises intimately contacting an aqueous solution of an antibiotic of the group consisting of streptomycin, dihydrostreptomycin, and streptothricin with a substantially water-immiscible organic solvent for soaps and a surface-active agent of the group consisting of mono (higher-aliphatic) esters of sulfuric acid and water-soluble salts thereof.

2. The method which comprises intimately contacting an aqueous solution of streptomycin with a substantially water-immiscible organic solvent for soaps and a surface-active agent of the group consisting of mono (higher-aliphatic) esters of sulfuric acid and water-soluble salts thereof.

3. The method which comprises intimately contacting an aqueous solution of an antibiotic of the group consisting of streptomycin, dihydrostreptomycin, and streptothricin with a substantially water-immiscible aliphatic alcohol and a surface-active agent of the group consisting of mono (higher-aliphatic) esters of sulfuric acid and water-soluble salts thereof.

4. The method which comprises intimately contacting an aqueous solution of an antibiotic of the group consisting of streptomycin, dihydrostreptomycin, and streptothricin with refined fermentation-amyl-alcohol and a surface-active agent of the group consisting of mono (higher-aliphatic) esters of sulfuric acid and water-soluble salts thereof.

5. The method which comprises intimately contacting an aqueous solution of an antibiotic of the group consisting of streptomycin, dihydrostreptomycin, and streptothricin with a substantially water-immiscible organic solvent for soaps and a surface-active agent of the group consisting of mono (higher-aliphatic) esters of sulfuric acid and water-soluble salts thereof, separating the organic solvent phase, and recovering the salt-type combination of the antibiotic and the surface-active agent from its solution in the organic solvent.

6. The method of purifying an antibiotic of the group consisting of streptomycin, dihydrostreptomycin, and streptothricin, which comprises intimately contacting an aqueous solution of the impure antibiotic with a substantially water-immiscible organic solvent for soaps and a surface-active agent of the group consisting of mono (higher-aliphatic) esters of sulfuric acid and water-soluble salts thereof, recovering the organic solvent phase, and converting the salt-type derivative of the antibiotic therein into a water-soluble salt of the antibiotic.

7. The method of purifying streptomycin, which comprises intimately contacting an aqueous solution of an impure streptomycin with a substantially water-immiscible organic solvent for soaps and a surface-active agent of the group consisting of mono (higher-aliphatic) esters of sulfuric acid and water-soluble salts thereof, recovering the organic solvent phase, and converting the salt-type derivative of streptomycin therein into a water-soluble salt of streptomycin.

8. The method of purifying streptomycin, which comprises intimately contacting an aqueous solution of an impure streptomycin with a substantially water-immiscible organic solvent for soaps and a surface-active agent of the group consisting of mono (higher-aliphatic) esters of sulfuric acid and water-soluble salts thereof, recovering the organic solvent phase, intimately contacting the organic solvent solution with an aqueous, water-soluble, relatively-strong acid, and recovering the aqueous phase.

9. The method of purifying streptomycin, which comprises intimately contacting a primary streptomycin-containing liquid with a substantially water-immiscible organic solvent for soaps and a surface-active agent of the group consisting of mono (higher-aliphatic) esters of sulfuric acid and water-soluble salts thereof, recovering the organic solvent phase, intimately contacting the organic solvent solution with an aqueous, water-soluble, relatively-strong acid, and recovering the aqueous phase.

10. The method of purifying streptomycin, which comprises treating a primary streptomycin-containing liquid with an activated charcoal, eluting the streptomycin from the charcoal with an aqueous, water-soluble mineral acid, intimately contacting the eluate with a substantially water-immiscible organic solvent for soaps and a surface-active agent of the group consisting of mono (higher-aliphatic) esters of sulfuric acid and water-soluble salts thereof, recovering the organic solvent phase, intimately contacting the organic solvent solution with an aqueous, water-soluble, relatively-strong acid, and recovering the aqueous phase.

11. The method which comprises intimately contacting an aqueous solution of streptomycin with a solution in a substantially water-immiscible organic solvent for soaps of a surface-active agent of the group consisting of mono (higher aliphatic) esters of sulfuric acid and water-soluble salts thereof.

12. The method which comprises mixing an aqueous solution of streptomycin with a surface-active agent of the group consisting of mono (higher aliphatic) esters of sulfuric acid and water-soluble salts thereof, and then intimately contacting the mixture with a substantially water-immiscible organic solvent for soaps.

13. The method of purifying streptomycin, which comprises intimately contacting an aqueous solution of an impure streptomycin with a substantially water-immiscible organic solvent for soaps and a surface-active agent of the group consisting of mono (higher-aliphatic) esters of sulfuric acid and water-soluble salts thereof, recovering the organic solvent phase, washing the organic solvent solution with water, and converting the salt-type derivative of streptomycin therein into a water-soluble salt of streptomycin.

14. The method which comprises intimately contacting an aqueous solution of streptomycin with a substantially water-immiscible organic solvent for soaps and a surface-active agent of the group consisting of mono (higher-aliphatic) esters of sulfuric acid and water-soluble salts thereof, adjusting the pH of the aqueous phase to between about 3.0 and 4.0, separating the organic solvent phase, and converting the salt-type derivative of streptomycin therein into a water-soluble salt of streptomycin.

15. The method which comprises intimately contacting an aqueous solution of streptomycin with a substantially water-immiscible organic solvent for soaps and an excess of a surface-active agent of the group consisting of mono (higher aliphatic) esters of sulfuric acid and water-soluble salts thereof, separating the organic solvent phase, and converting the salt-type derivative of streptomycin therein into a water-soluble salt of streptomycin.

16. The method which comprises intimately contacting an aqueous solution of streptomycin with a substantially water-immiscible organic solvent for soaps and the compound $$C_4H_9CH(C_2H_5)C_2H_4CH(SO_4Na)C_2H_4CH(C_2H_5)_2$$

WILLIAM A. LOTT.
JACK BERNSTEIN.
LEON J. HEUSER.

(References on following page)

REFERENCES CITED

The following references are of record in the file of this patent:

UNITED STATES PATENTS

| Number | Name | Date |
|---|---|---|
| 2,052,192 | Piggott | Aug. 25, 1936 |
| 2,053,474 | Graves et al. | Sept. 8, 1936 |
| 2,104,728 | Bertsch et al. | Jan. 11, 1938 |
| 2,245,539 | Warnat | June 10, 1941 |
| 2,441,063 | Gilmann | May 4, 1948 |

OTHER REFERENCES

Kuehl et al., Science, vol. 102 (1945), pp. 34–35.